Aug. 4, 1925. 1,548,504
O. W. BECKER
METHOD FOR PRODUCING SEAMLESS ARTIFICIAL SAUSAGE SKINS
Filed June 8, 1925

Inventor
O. W. Becker
by Langner, Parry, Card & Langner
Attys.

Patented Aug. 4, 1925.

1,548,504

UNITED STATES PATENT OFFICE.

OSKAR WALTER BECKER, OF STUTTGART, GERMANY.

METHOD FOR PRODUCING SEAMLESS ARTIFICIAL SAUSAGE SKINS.

Application filed June 8, 1925. Serial No. 35,829.

*To all whom it may concern:*

Be it known that I, OSKAR WALTER BECKER, citizen of Germany, residing at Stuttgart, Germany, have invented certain new and useful Improvements in Methods for Producing Seamless Artificial Sausage Skins (for which I have filed an application in Germany on 4th February, 1924), of which the following is a specification.

For manufacturing seamless artificial skins there have been a number of methods suggested. For instance, there is a dipping method wherein round bars forming cores are dipped into a suitable viscous mass or fluid such as gelatine or viscose, the skin thus produced being hardened by means of drawing it through a circular opening and after the hardening, loosening it from the core. There is also a pressing method in which viscose or a similar non-hardening mass is squirted through an annular nozzle after which it is washed with a hardening means. There is also the impregnating method wherein a suitable fabric is covered or impregnated with a mass consisting of comminuted or disintegrated flesh, comminuted skin or the like, together with the addition of blood plasm, and is then allowed to dry on a solid core.

This invention starts with the latter method in producing seamless artificial skins by applying a mass of animal or vegetable albumin or albuminoid on a tubular fabric, with the difference, however, that the mass together with the tubular fabric is passed through an annular nozzle in a thin film and the material then dried. After this the tubular fabric is loosened and pulled off of the thus shaped dry material. By means of this new method the various defects formerly presented are completely avoided. One such defect was the poor appearance of the sausage skins formerly produced which were therefore incapable of use for sausage products of high quality. Further by means of the old method the skins would not snugly fit the sausage material or else they were too pervious to moisture and gave rise to a sweating out of the sausage material and thus to decrease in weight, and also caused a too rapid drying.

In carrying out the new method a mass of albumin or albuminoid of animal or vegetable origin consisting of glue giving cells or glue substances, is brought into such a condition that it can be readily pressed after being subjected to the known soaking or swelling process such as by means of gelatine dissolved in glycerine of a suitable concentration. The material is treated to this soaking process after a previous mechanical disintegration. The mass thus formed is pressed onto a tubular fabric which draws it through an annular nozzle whereby the mass is given the necessary skin compactness.

When the mass is dried, which may be accelerated by use of dry air or the addition of alcohol or the like, the film pressed onto the fabric which preferably was previously treated with a caustic alkali such, for example, as gaseous ammonia, is then separated from the fabric by means of catching hold of the fabric at its end and pulling it through the inside of the tubular film to its full length. This pulling of the fabric away from the film may under certain conditions be facilitated by operating so that the film at its end is not directly pressed onto the tubular fabric but is pressed onto a short intermediate layer of paper or the like surrounding the fabric. At this end the fabric can be easily peeled off due to the intermediate layer so as to facilitate catching hold of it for pulling it through the tubular film.

In order that the invention can be clearly understood an apparatus such as is described and claimed in my copending U. S. application, Serial No. 35,830, filed June 8, 1925, is described with reference to the accompanying drawings wherein:

Figure 3:
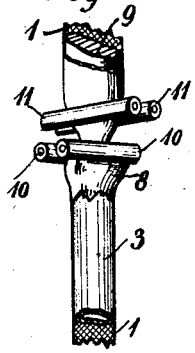
Fig. 3, is a perspective view of the core.
Figure 1:
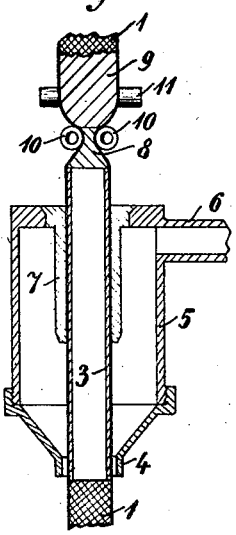
Fig. 1 is a vertical section of an apparatus adapted to carry out this invention.
Figure 2:
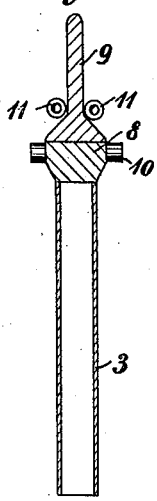
Fig. 2 is a vertical section of a floating core taken at right angles to the plane of Fig. 1.
Figure 4:
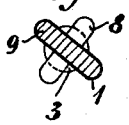
Fig. 4 is a sectional plan view of the core.

The hose or tubular fabric 1, to which the mass of animal or vegetable albumin is applied by pressure is drawn over a core 3 which is preferably formed as a hollow cylinder projecting concentrically into a ring formed by the outlet opening 4 of a vessel 5. By means of a pipe 6 the vessel 5 is filled with the material by means of pressure, the material passing out through the annular space between the fabric 1 and the outlet opening 4, these parts thus forming an annular nozzle. As the tubular fabric is pulled along over the core it is covered with a film of albuminous material. The core 3 and tubular fabric 1 is held in a tubular guide 7 having an opening sufficiently large to permit the fabric to pass through the space between the guide 7 and the core 3.

To sustain the weight of the core and the strains which it undergoes due to the fabric being pulled over the core there are provided at the outside of the vessel 5, irregularities in the cross section of said core without, however, changing the peripheral measurement of any cross section. In the construction according to Figs. 1 to 5 this variation comprises two flat portions 8 and 9 arranged at 90° to one another. Two pairs of rollers 10 and 11 are placed to bear against the flat portions and constitute supporting members to take up all force and strains exerted by the operation on the core which is thus floatingly held in fixed position.

Figure 5:
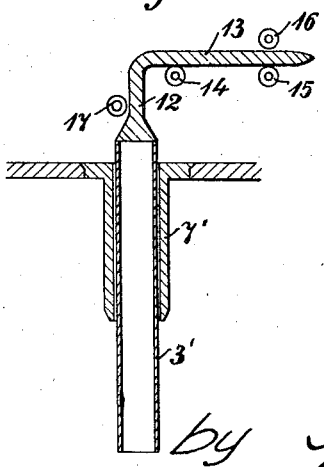
Fig. 5 is a vertical section of a modified form of device.
Figure 6:
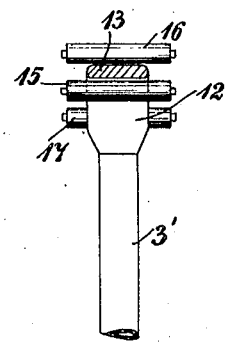
Fig. 6 is a sectional side view of the device of Fig. 5.

As explained above the flattened portions are so dimensioned that regardless of the shape of any cross section of the core the peripheral measurements of all such cross sections are equal, so that the fabric drawn over the core will closely conform to the surface of the core. When this condition of uniform peripheral measurement is substantially attained there is assurance that the fabric will not fold, but will pass the guide rollers 10 and 11 in a smooth manner. Since the rollers securely support the core from outside the vessel 5 and prevent all longitudinal movement of the same it is clear that the tubular fabric can be given any desired length without necessitating any prolongation of the core 3. A similar construction is shown in Figs. 5 and 6 and in this case the core is provided with but a single flattened portion 12 which, however, is bent so that one portion 13 is positioned horizontally and acts as a hook. This flattened portion 12 can be readily supported by rollers 14, 15, 16 and 17 in such a manner that all force and strains tending to move the core are transmitted to the rollers so that the core is floatingly suspended. In this construction as in the first construction described the peripheral measurements of all cross sections of the core are equal so that the fabric can pass over the core without folding.

The proper positioning of the core is assisted, in addition to the rollers, by the tubular guide 7. The mass forced into the vessel 5 under pressure is compelled to surround the portion of the core between the opening 4 and the guide 7, throughout the entire circumference of the core.

In counterdistinction to the products of the methods known heretofore the artificial sausage skins produced in the above described manner, due to the pressure used in applying the film to the fabric, can bear a much greater pressure when the sausage material is stuffed into them. Skins so produced are so strong that after the sausage is finished it will not be cut through by tying it off. Also under normal conditions sausages produced in such a manner can be stored for an unlimited length of time.

In spite of the pressure used in forming the skins, the capacity for curing the sausage is in no manner impaired. In curing the smoke is quickly absorbed and even the usual quick curing processes can be readily used. The finished sausage has the same appearance as the natural intestine sausage skin without impairing the easy loosening of the skin from the sausage material or impairing movement of the sausage mass in any manner. Its transparency and therefore its fresh appearance is secured due to the fact that in being pressed through the annular nozzle the outer surface is polished.

I claim:

1. A method for producing seamless artificial sausage skins, comprising, pressing a thin film of albuminous material onto a tubular fabric, drying the film on the fabric, and then separating the tubular fabric from the film.

2. A method for producing seamless artificial sausage skins, comprising, pressing a thin film of albuminous material onto a tubular fabric, drying the film on the fabric, and then separating the tubular fabric from the film, the film being pressed onto the fabric by passing the fabric through an annular nozzle, and forcing the material through the nozzle on the outer side of the fabric.

3. A method for producing seamless artificial sausage skins, comprising, pressing a thin film of albuminous material onto a tubular fabric, drying the film on the fabric, and then separating the tubular fabric from the film, the film of material being pressed onto the fabric by pressing the material between the outer side of the fabric and a nozzle, and positioning a core inside of the fabric and within the nozzle.

In testimony whereof I have signed my name to this specification.

OSKAR WALTER BECKER.